United States Patent [19]

Raio et al.

[11] Patent Number: 5,417,149
[45] Date of Patent: May 23, 1995

[54] PIZZA PRESS WITH INTERCHANGEABLE UPPER MOLD

[75] Inventors: Eugene L. Raio, Huntington Beach; Arnold R. Dyess, Paramount, both of Calif.

[73] Assignee: Proprocess Corporation, Paramount, Calif.

[21] Appl. No.: 186,382

[22] Filed: Jan. 24, 1994

[51] Int. Cl.⁶ .................. A21C 11/00; B29C 43/02
[52] U.S. Cl. .................................. 99/349; 99/353; 99/432; 100/93 P; 425/394; 425/412
[58] Field of Search .................... 99/349, 353–355, 99/426, 432, 372, 380, 422, 450.1, 483; 100/92, 93 R, 93 P; 425/136, 151, 160, 298, 324.1, 343, 293, 317, 394, 412, 383, 398; 426/496, 512

[56] References Cited

U.S. PATENT DOCUMENTS

| | | | |
|---|---|---|---|
| 1,880,858 | 10/1932 | Davis | 425/343 X |
| 3,716,319 | 2/1973 | Norman | 425/394 |
| 4,303,677 | 12/1981 | De Acetis | 99/349 X |
| 4,559,002 | 12/1985 | Atwood | 425/394 X |
| 4,690,043 | 9/1987 | Pacilio | 99/353 |
| 4,973,240 | 11/1990 | Reilly | 425/412 X |
| 5,074,778 | 12/1991 | Betts, Jr. et al. | 425/412 X |
| 5,149,594 | 9/1992 | Lewandowski et al. | 426/496 |
| 5,154,115 | 10/1992 | Kian | 99/432 X |
| 5,226,352 | 7/1993 | Savage | 99/439 |

*Primary Examiner*—Timothy F. Simone
*Attorney, Agent, or Firm*—Stetina Brunda & Buyan

[57] ABSTRACT

A device for forming and par baking a pizza crust from a quantity of pizza dough disposed in a pizza pan. The device comprises a frame having a base portion and an upper housing portion. Releasably attached to the upper housing portion is an upper mold, while releasably attached to the base portion is a lower support platen. Pivotally connected to the upper housing portion is a handle member which is adapted to reciprocally move the upper mold between a loading position wherein the pizza dough may be introduced into the pizza pan and a flattening position wherein the pizza dough is compressed between the bottom surface of the upper mold and the pizza pan. Slidably attached to the support platen are at least two retaining members which extend upwardly from the top surface thereof. Also slidably attached to the support platen is an adjustment mechanism for selectively moving the retaining members linearly relative the top surface as needed to allow the pizza pan to be positioned therebetween.

11 Claims, 3 Drawing Sheets

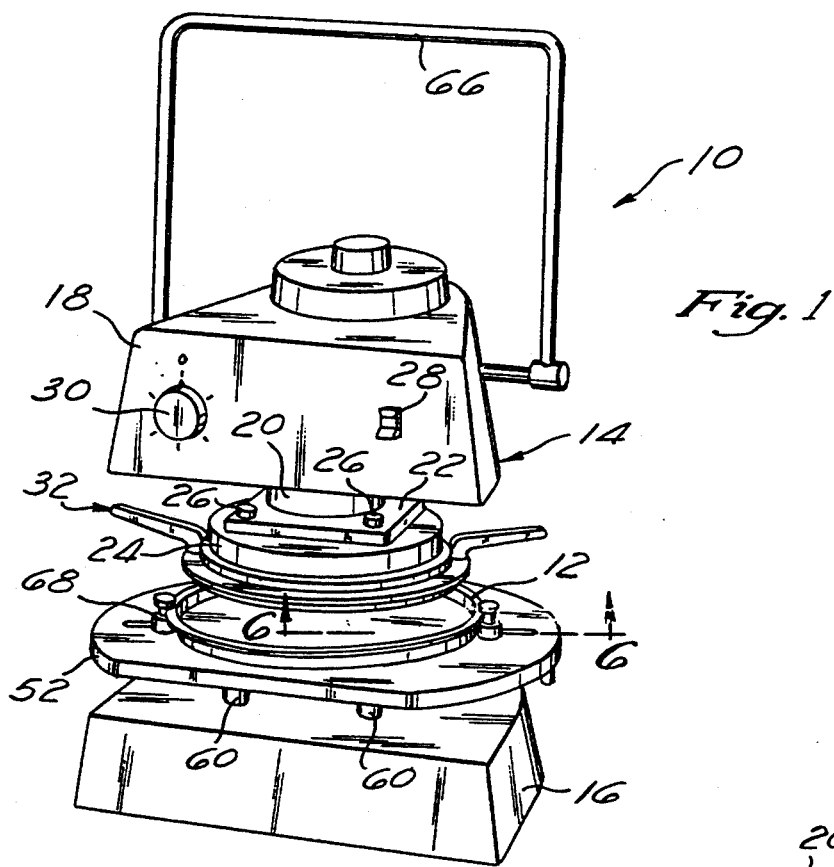
Fig. 1
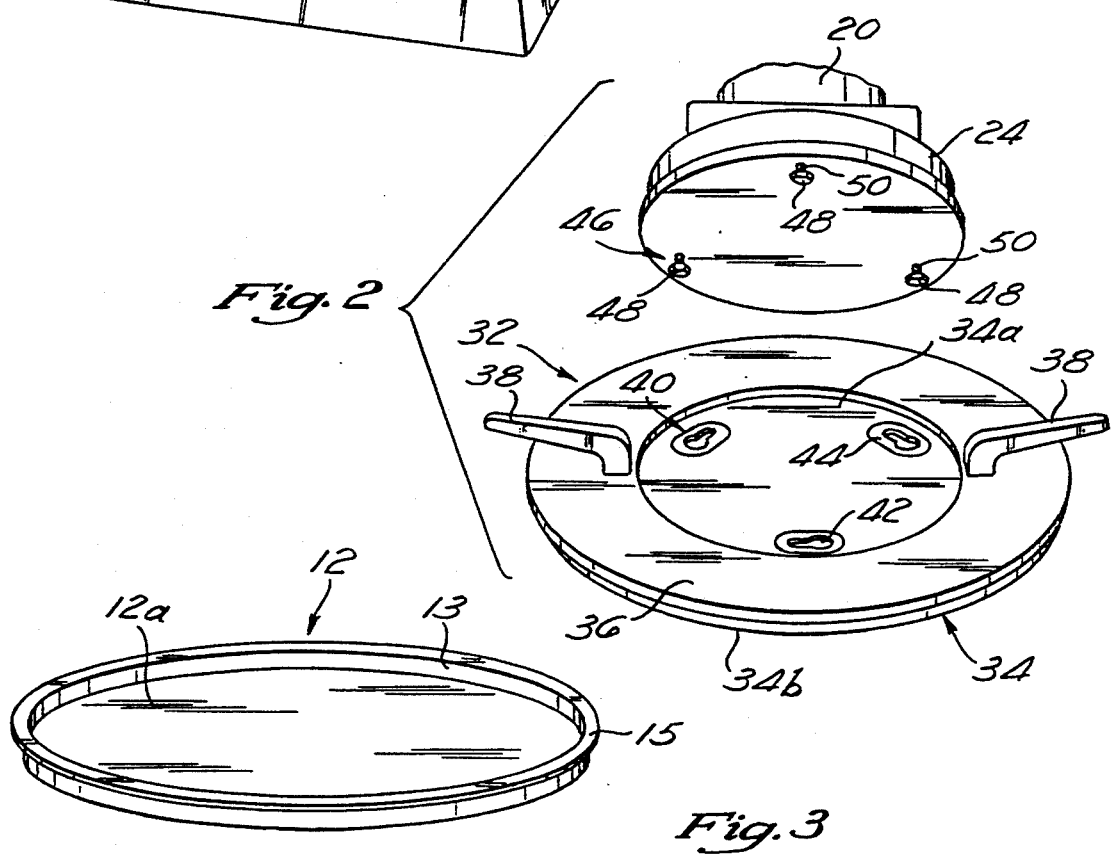
Fig. 2
Fig. 3

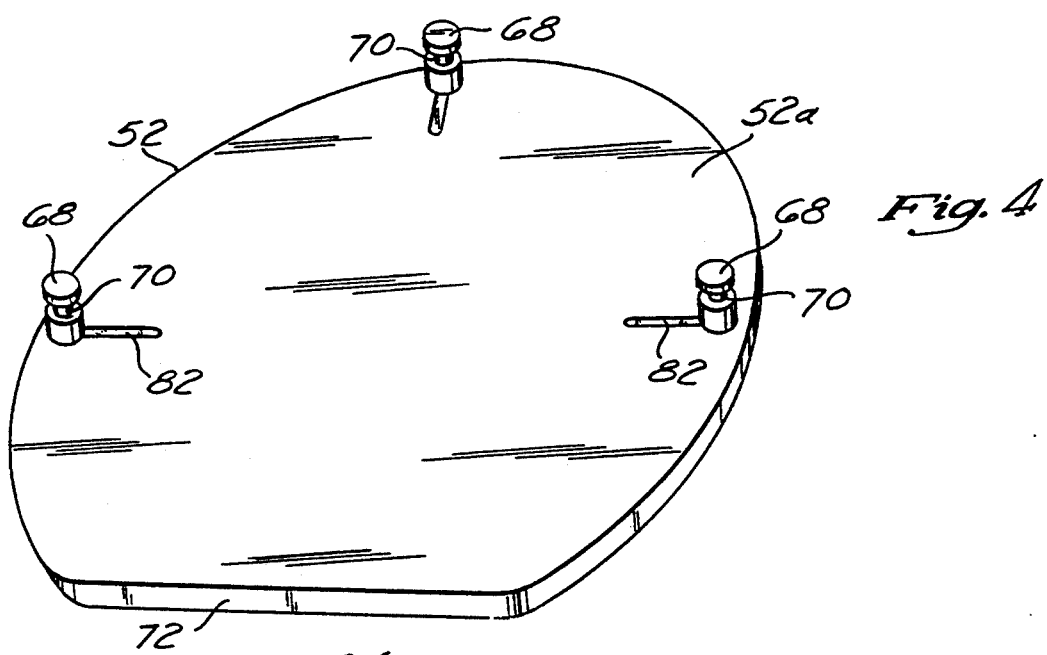
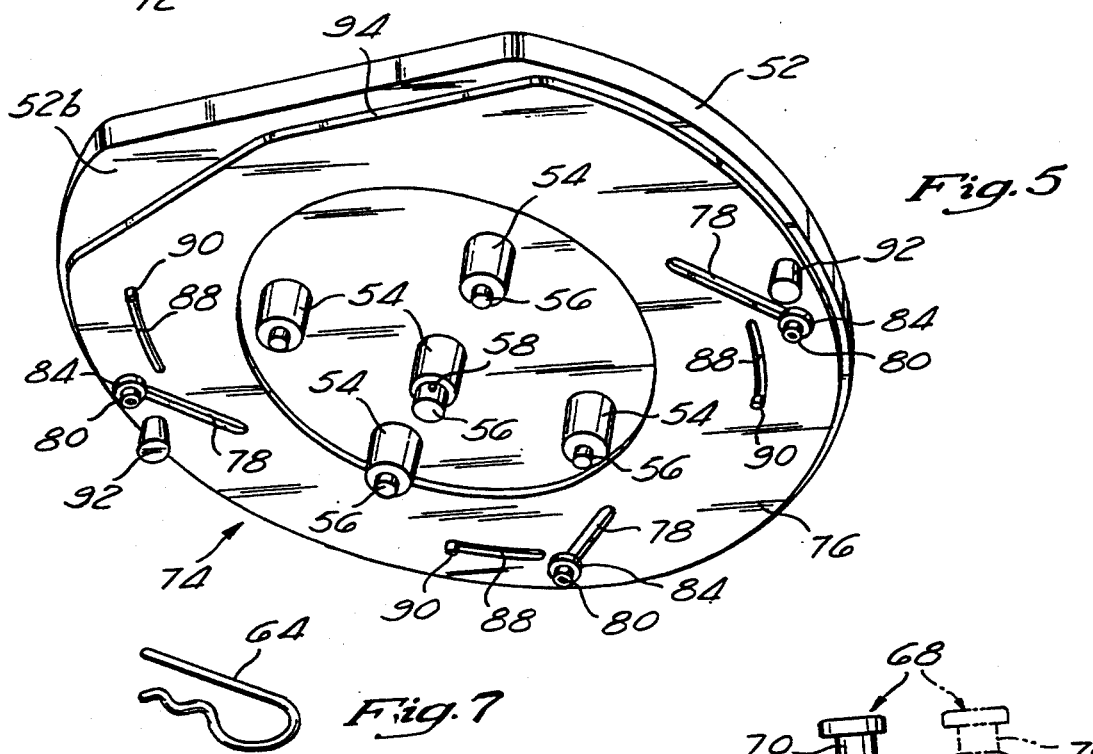
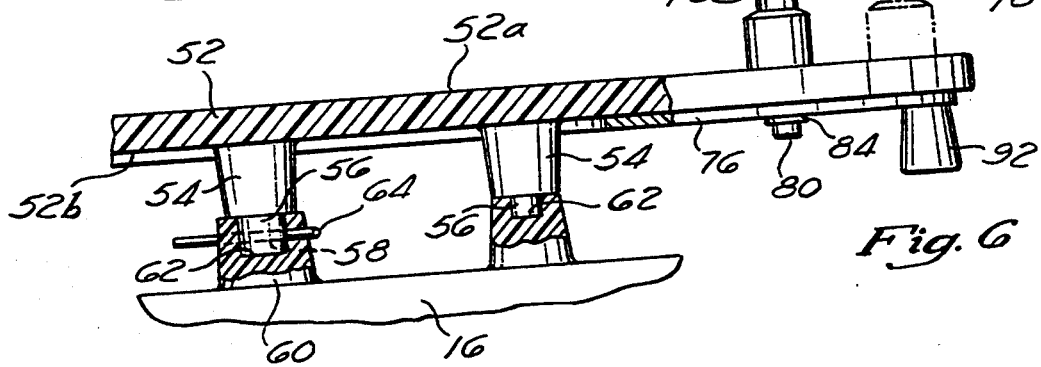

PIZZA PRESS WITH INTERCHANGEABLE UPPER MOLD

FIELD OF THE INVENTION

The present invention relates generally to food preparation devices, and more particularly to an improved pizza press with an interchangeable upper mold for forming and par baking differently sized pizza crusts from a quantity of fresh dough.

BACKGROUND OF THE INVENTION

Commercial establishments specializing in the preparation of pizzas generally use devices to aid in the preparation of such pizzas which are designed with a number of frequently competing goals in mind. First and foremost, the preparation devices must produce pizzas in a proper manner, and on a predictably repeatable basis which are appealing in both taste and appearance. Secondly, the devices must be able to satisfy production requirements in an efficient, user-friendly manner, without undue space, power or labor requirements. Additionally, in view of applicable health and safety codes, the devices should be constructed so that they may be thoroughly and easily cleaned to insure the healthfulness of products prepared thereby.

With regard to currently known methods in the production of pizzas, generally the two most time-consuming stages of the production process involve the forming of the crust and the baking of the prepared pizza pie. With regard to the formation of the crust, a variety of pizza dough flattening devices are presently available for commercial use. Additionally, a number of devices for par baking the crust of the pizza are likewise available for commercial use. Though such flattening and par baking devices are generally adequate to perform the pizza production process, they suffer in relation to some of the requirements discussed above.

The utilization of a par baked crust significantly reduces the baking time associated with a pizza, thereby greatly diminishing the production time associated with the preparation process. Presently known dough flattening devices typically do not include the capacity to simultaneously par bake the dough while the dough flattening/crust forming process is being conducted. Thus, the time savings obtained in the cooking process by using a par baked crust is often negated by the additional time needed to conduct the par baking process after the crust has been formed by a conventional flattening device. Though it is well known for commercial pizza establishments to use frozen par baked crusts, such crusts, in addition to being costly, must often be stored within a refrigerator for days or weeks before being utilized, thus diminishing the taste quality of pizzas produced therefrom.

In addition to not having the capacity to par bake a crust, many currently known flattening devices also do not include the capacity to produce pizza crusts of more than one size (i.e., diameter). Due to the inability of such flattening devices to produce more than one size of pizza crust, many commercial pizza establishments are burdened with the costs of purchasing and maintaining multiple flattening devices, each of which are utilized to produce only a single size of pizza crust. Further, in most currently known flattening devices, the formed pizza crust must be removed from the device and placed into a suitable pan for further preparation and baking. As will be recognized, this transfer operation of the formed crust from the flattening device to the pizza pan increases the overall length of the preparation process, in addition to frequently resulting in damage to the pizza crust during the transfer.

Prior to the present invention, no dough flattening devices or par baking devices have satisfactorily addressed the previously mentioned deficiencies in the manner suggested by the present invention. The present invention provides a pizza press for simultaneously forming and par baking the crust of a pizza. The pizza press disclosed herein also incorporates an interchangeable upper mold for facilitating the preparation of differently sized pizza crusts. Additionally, the press is adapted to accommodate differently sized pizza pans which function as a lower mold in the press, thus allowing subsequent preparation procedures to be conducted without the necessity of having to transfer the formed crust from the press into a pizza pan.

SUMMARY OF THE INVENTION

In accordance with a preferred embodiment of the present invention, there is provided a pizza press for forming and par baking a pizza crust from a quantity of pizza dough disposed in a pizza pan. The pizza press comprises a frame having a base portion and an upper housing portion. Releasably attached to the upper housing portion is an upper mold which defines a generally planar bottom surface. Releasably attached to the base portion is a lower support platen which defines a generally planar top surface. The bottom surface of the upper mold and the top surface of the lower support platen extend along horizontal, generally parallel planes. Pivotally connected to the upper housing portion of the frame is a handle member which is adapted to reciprocally move the upper mold between a loading position wherein the pizza dough may be introduced into the pizza pan and a flattening position wherein the pizza dough is compressed between the bottom surface of the upper mold and the pizza pan.

Slidably attached to the support platen and extending upwardly from the top surface thereof are at least two, and preferably three retaining members. In the preferred embodiment, the support platen has a generally circular configuration, with the retaining members being positioned about the periphery thereof in intervals of approximately ninety degrees. Also slidably attached to the support platen is an adjustment mechanism for selectively moving the retaining members linearly relative the top surface as needed to allow the pizza pan to be positioned therebetween.

The adjustment mechanism preferably comprises an adjustment plate having three elongate positioning slots disposed therein. A portion of each of the retaining members is extended through and slidably movable within a respective one of the positioning slots. Attached to the adjustment plate in opposed relation is a pair of adjustment knobs. The positioning slots are configured in a manner wherein the rotation of the adjustment plate in a first direction via the adjustment knobs simultaneously moves the retaining members linearly toward the center of the support platen. Conversely, the rotation of the adjustment plate in a second direction opposite the first direction simultaneously moves the retaining members linearly toward the peripheral edge of the support platen. The adjustment plate further includes three arcuately contoured guide slots disposed therein, with the support platen further including three guide pins extending therefrom, each of which are slidably received into respective ones of the guide slots. The portion of each of the retaining members which is extended through a respective one of the positioning slots is selectively tightenable and adapted to prevent the rotation of the adjustment plate when tightened.

The upper mold is releasably attached to a heating element of the upper housing portion in a manner wherein heat is transferred from the heating element to the bottom surface of the upper mold. The heating element is movable concurrently with the upper mold. In the preferred embodiment, the upper mold and pizza pan have generally circular configurations, with the pizza pan being sized to receive the bottom surface of the upper mold. Additionally, each of the retaining members is preferably configured to partially capture a peripheral sidewall portion of the pizza pan.

The present invention further comprises a method for forming and par baking a pizza crust. In the preferred method, a quantity of pizza dough is introduced into a pizza pan, with the pizza pan subsequently being placed onto a lower support platen. Thereafter, the positions of retaining members extending upwardly from the support platen are adjusted as needed to allow the pizza pan to be positioned therebetween. An upper mold is then lowered into the pizza pan to compress the pizza dough between the upper mold and the pizza pan. Prior to being received into the pizza pan, the upper mold may be heated.

BRIEF DESCRIPTION OF THE DRAWINGS

These, as well as other features of the present invention may become more apparent upon reference to the drawings wherein:

FIG. 1 is a perspective view of a pizza press for forming and par baking a pizza crust from a quantity of pizza dough constructed in accordance with the present invention;

FIG. 2 is an exploded view illustrating the manner in which an upper mold is releasably attached to the heating element of the pizza press;

FIG. 3 is a perspective view of a pizza pan utilized in conjunction with the pizza press;

FIG. 4 is a top perspective view of a lower support platen of the pizza press and retaining members slidably attached thereto;

FIG. 5 is a bottom perspective view of the lower support platen and adjustment mechanism slidably attached thereto;

FIG. 6 is a partial cross-sectional view illustrating the manner in which the lower support platen is releasably attached to the frame of the pizza press;

FIG. 7 is a perspective view of a pin utilized to facilitate the releasable attachment of the lower support platen to the frame;

DETAILED DESCRIPTION OF THE PREFERRED EMBODIMENT

Figures 8, 9:
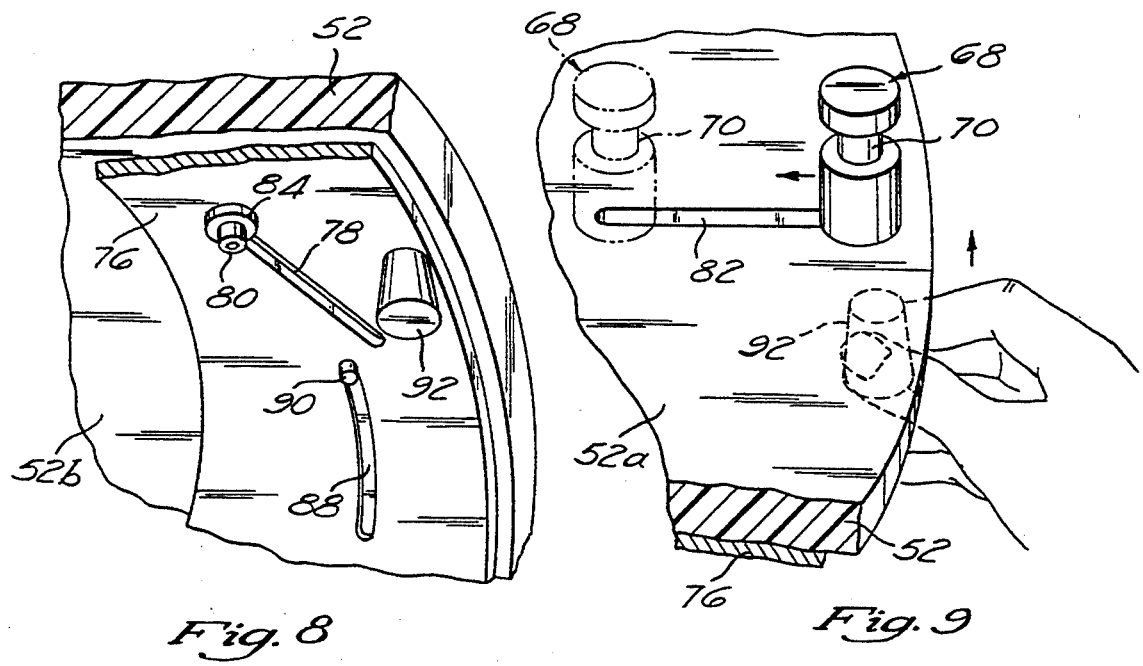
FIG. 8 is a partial perspective view illustrating the engagement of a retaining member to the adjustment mechanism.
FIG. 9 is a partial perspective view illustrating the manner in which the retaining members are moved linearly relative the lower support platen.

Referring now to the drawings wherein the showings are for purposes of illustrating a preferred embodiment of the present invention only, and not for purposes of limiting the same, FIG. 1 perspectively illustrates a pizza press 10 constructed in accordance with the present invention which is utilized for forming and par baking a pizza crust from a quantity of pizza dough disposed within a pizza pan 12. In the preferred embodiment, the pizza press 10 comprises a frame 14 having a base portion 16 and an upper housing portion 18. Extending downwardly from the lower surface of the upper housing portion 18 is a piston 20, the distal end of which includes a generally square flange 22 formed thereabout. Rigidly attached to the flange 22 is a circularly configured heating element 24 which defines a generally planar lower surface 24a. The attachment of the heating element 24 to the flange 22 is preferably facilitated by four (4) bolts 26, each of which are extended through a respective one of the corner regions of the flange 22 and threadably received into the heating element 24. The heating element 24 is activated via an on/off switch 28 disposed on the front face of the upper housing portion 28, with the heat output of the heating element 24 being regulated by a control knob 30 also disposed on the front face of the upper housing portion 18.

Referring now to FIGS. 1 and 2, releasably attached to the heating element 24 is an upper mold 32. In the preferred embodiment, the upper mold 32 comprises a circular platen 34 having generally planar top and bottom surfaces 34a, 34b. Attached to the top surface 34a is an annular ring member 36 having a diameter slightly exceeding the diameter of the platen 34. As best seen in FIG. 2, the ring member 36 defines a circularly configured region of the top surface 34a within the central opening thereof which has a diameter slightly exceeding the diameter of the lower surface 24a of the heating element 24. Attached to the ring member 36 in opposed relation and extending radially outward therefrom is a pair of elongate handle members 38. Additionally, disposed within the encircled region of the top surface 34a are three (3) identically configured detents 40, each of which include a circular aperture region 42 and an accompanying notch region 44 of reduced size. The detents 40 are spaced equidistantly about the encircled region of the top surface 34a (i.e., in intervals of approximately 120°).

Disposed on the lower surface 24a of the heating element 24 are three (3) identically configured engagement members 46, which preferably comprise bolts defining enlarged heads 48 and threaded shanks 50 which are threadably received into the heating element 24. The engagement members 46 are attached to the heating element 24 in a pattern identical to the detents 40, and thus are equidistantly spaced in intervals of approximately 180°. In the preferred embodiment, the attachment of the upper mold 32 to the heating element 24 is facilitated by grasping the handle members 38 and aligning the heads 48 of the engagement members 46 with respective ones of the aperture regions 42 of the detents 40. Thereafter, the upper mold 32 is raised so as to facilitate the receipt of the heads 48 into the aperture regions 42. The upper mold 32 is then rotated in a counter-clockwise direction, thus causing the shanks 50 of the engagement members 46 to be slidably received into respective ones of the notch regions 44 of the detents 40. The disengagement of the upper mold 32 from the heating element 24 is conducted in a reverse sequence by rotating the upper mold 32 in a clockwise direction so as to cause the shanks 50 of the engagement members 46 to slide out of the notch regions 44 of the detents 40. Thereafter, the upper mold 32 is lowered, thus removing the heads 48 of the engagement members 46 from within the aperture regions 42 of the detents 40.

As will be recognized, the interface of the engagement members 46 to the detents 40 in the aforementioned manner maintains the upper mold 32 in rigid attachment to the heating element 24. Due to the configuration of the engagement members 46 and detents 40, the lower surface 24a of the heating element 24 will be abutted directly against the top surface 34a of the platen 34 when the upper mold 32 is attached to the heating element 34. The abutting contact between the lower surface 24a and the top surface 34a facilitates an optimal transfer of heat from the heating element 24 to the platen 34, and in particular the bottom surface 34b thereof. To further optimize the heat transfer between the heating element 24 and upper mold 32, the lower surface 24a and platen 34 are preferably fabricated from a metal such as stainless steel or copper, though other materials may also be utilized. When the upper mold 32 is attached to the heating element 24, a portion thereof including the lower surface 24a will reside within the central opening of the ring member 36. Importantly, differently sized upper molds (i.e., upper molds incorporating platens of differing outer diameter dimensions) may be selectively attached to the heating element 24. In this respect, the platen of any particular upper mold need only include the detents 40 formed therein to accommodate the engagement members 46 of the heating element 24 in the aforementioned manner.

Referring now to FIGS. 1, 5 and 6, releasably attached to the upper surface of the base portion 16 is a lower support platen 52 having a generally circular configuration and defining generally planar top and bottom surfaces 52a, 52b. Attached to the bottom surface 52b and extending perpendicularly relative thereto are five (5) male posts 54, each of which include a reduced diameter portion 56 formed on the distal end thereof. The male posts 54 are oriented upon the upper surface in a generally X-shaped configuration, with the reduced diameter portion 56 of the central male post 54 being larger than the remaining reduced diameter portions 56 and including an aperture 58 extending laterally therethrough. Attached to the upper surface of the base portion 16 in generally perpendicular relation relative thereto are five (5) female posts 60, each of which include a circularly configured recess 62 disposed in the distal end thereof. The female posts 62 are oriented on the upper surface of the base portion 16 in a pattern identical to that of the male posts 54 (i.e., in a generally X-shaped configuration).

In the preferred embodiment, the attachment of the support platen 52 to the base portion 16 is facilitated by the engagement of the male posts 54 to respective ones of the female posts 62. As will be recognized, the recess 62 disposed within the central female post 60 is sized to accommodate the reduced diameter portion 56 of the central male post 54, with the recesses 62 of the remaining female posts 60 being sized to accommodate the reduced diameter portions 56 of the remaining male posts 54. When the reduced diameter portions 56 of the male posts 54 are received into the recesses 62 of the corresponding female posts 60, the aperture 58 extending laterally through the central male post 54 is coaxially aligned with a pair of apertures extending laterally through the central female post 60 into communication with the recess 62 thereof. Slidably extended through these coaxially aligned apertures is a lock pin 64 as shown in FIG. 7 which is utilized to maintain the support platen 52 in engagement to the base portion 16. As will be recognized, the lock pin 64 must be removed from within the coaxially aligned apertures of the central male and female posts 54, 60 to remove the support platen 52 from the base portion 16. When the support platen 52 is releasably attached to the base portion 16 in the aforementioned manner, the top surface 52a of the support platen 52 and the bottom surface 34b of the upper mold 32 attached to the heating element 24 extend along horizontal, generally parallel planes. The support platen 52 is preferably fabricated from a hard plastic, though other materials may also be utilized.

In the preferred embodiment, the pizza press 10 of the present invention is adapted to be utilized in conjunction with the circularly configured pizza pan 12 which itself defines a top surface 12a circumvented by an upwardly extending sidewall or rim 13. Extending laterally outward from the distal edge of the sidewall 13 is a continuous flange portion 14. Importantly, the pizza pan 12 is intended to function as the lower mold for the pizza press 10 and thus is placed upon the top surface 52a of the support platen 52 subsequent to having a quantity of pizza dough introduced thereinto (i.e., disposed upon the top surface 12a thereof).

Pivotally connected to the upper housing portion 18 is a handle member 66. In the preferred embodiment, the handle member 66 is adapted to reciprocally move the piston 20, and hence the heating element 24 and upper mold 32 attached thereto, between (a.) a loading position wherein the pizza pan 12 including the quantity of pizza dough therein may be placed upon the top surface 52a of the support platen 52 beneath the upper mold 32; and (b.) a flattening position wherein the pizza dough is compressed between the bottom surface 34b of the upper mold 32 and the top surface 12a of the pizza pan 12. As will be recognized, prior to actuating the upper mold 32 to the flattening position, the pizza pan 12 including the pizza dough therein must necessarily be in substantial vertical alignment with the bottom surface 34b of the upper mold 32.

As previously specified, the upper mold 32 and pizza pan 12 each have circular configurations. The pizza pan 12 is also sized to receive the platen 34 of the upper mold 32 during the flattening process, thus causing a portion of the pizza dough to be pushed upwardly between the inner surface of the pizza pan sidewall 13 and peripheral surface of the platen 34 and facilitating the formation of the resultant pizza crust with a generally uniform edge. The upward movement of the dough between the sidewall 13 and platen 34 is limited by the portion of the ring member 36 of the upper mold 32 which extends radially beyond the peripheral edge of the platen 34. Importantly, the bottom surface 34b of the upper mold 32 may be heated via the heating element 24 when in the loading position, thus facilitating the par baking of the pizza crust when the upper mold 32 is actuated to the flattening position.

It will be recognized that the quantity of pizza dough need not be disposed within the pizza pan 12 prior to the placement thereof upon the support platen 52. In this respect, a sufficient space exists between the top surface 52a of the support platen 52 and the bottom surface 34b of the upper mold 32 when the same is in the loading position so as to allow the pizza pan 12 to be initially placed upon the top surface 52a with the quantity of pizza dough subsequently being disposed therein. The size (i.e., diameter) of the pizza pan 12 placed upon the support platen 52 is dependent upon the size of the particular upper mold 32 attached to the heating element 24. As such, the size of the pizza pan 12 to be utilized with the pizza press 10 will always be selected to accommodate the particular upper mold 32 attached to the heating element 24.

As previously discussed, the pizza press 10 of the present invention may be used to produce differently sized pizza crusts by interchanging the upper mold 32 and pizza pan 12. Since the pizza pan 12 must be maintained in vertical alignment with the upper mold 32 irrespective of the sizes thereof, the pizza press 10 is provided with means for maintaining various sizes of pizza pans 12 in vertical alignment with a corresponding upper mold 32.

In particular, the pizza press 10 includes at least two, and preferably three, generally cylindrical retaining members 68 slidably attached to the support platen 52 and extending upwardly from the top surface 52a in substantially perpendicularly relation thereto. In the preferred embodiment, the retaining members 68 include reduced diameter regions 70 formed adjacent the upper ends thereof which are adapted to partially capture the flange portion 15 of the pizza pan 12 as shown in FIG. 1 and as will be discussed in more detail below. As best seen in FIG. 4, the support platen 52 is formed to include a linearly extending edge portion 72 which, when the support platen 52 is attached to the base portion 16, defines the frontal edge of the support platen 52 disposed closest the pizza press operator. Advantageously, the provision of the support platen 52 with the linear edge portion 72 allows the operator to stand closer to the pizza press 10 during the operation thereof, thus making the manipulation of the handle member 66 an easier task. The retaining members 68 are preferably positioned about the remaining, arcuately contoured peripheral edge portion of the support platen 52 in intervals of approximately 90 degrees. In particular, one of the retaining members 68 is oriented at approximately a twelve o'clock position relative the linear edge portion 72, with the remaining two retaining member 68 being oriented at three o'clock and nine o'clock positions, respectively, relative the linear edge portion 72.

Figure 10:
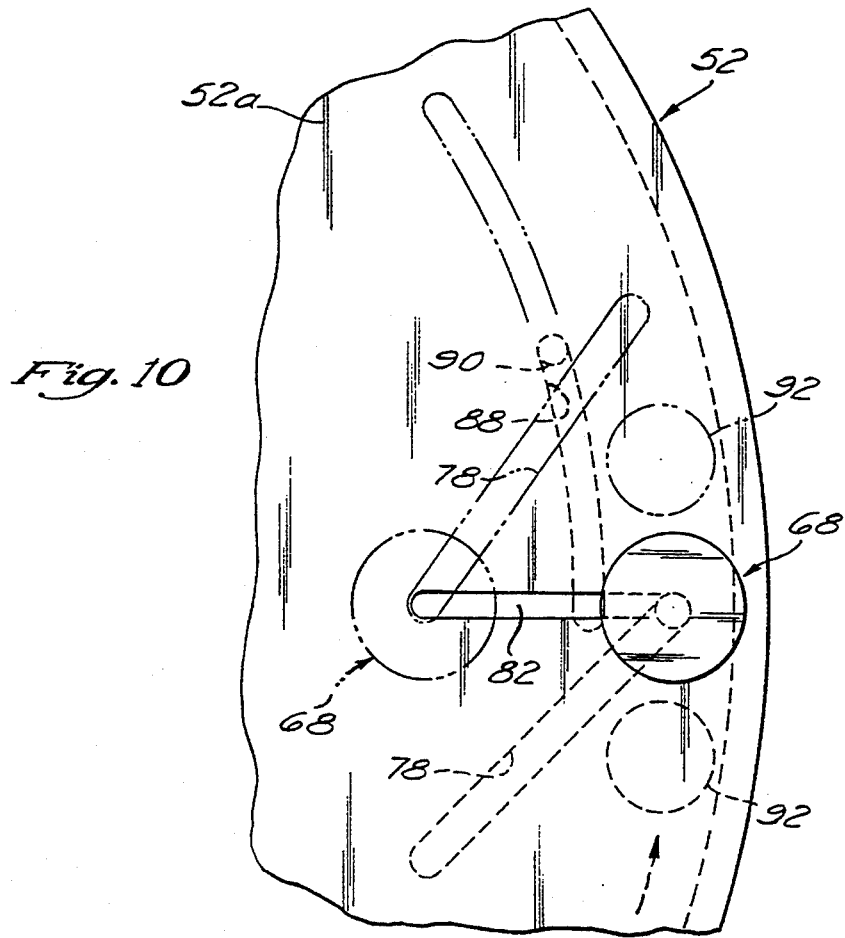
FIG. 10 is a partial elevational view of the lower support platen illustrating the manner in which the adjustment mechanism facilitates the linear movement of the retaining members relative the lower support platen.

In the preferred embodiment, each of the retaining members 68 is movable relative the top surface 52a of the support platen 52 in a linear fashion as needed to allow a particularly sized pizza pan 12 to be positioned therebetween. Referring now to FIGS. 5–10, the selective linear movement of the retaining members 68 is facilitated by an adjustment mechanism 74 slidably attached to the bottom surface 52b of the support platen 52. The adjustment mechanism 74 comprises an annular adjustment plate 76 which defines a central opening sized to accommodate the male posts 54. Disposed within the adjustment plate 76 in intervals of approximately ninety degrees are three (3) elongate positioning slots 78. As best seen in FIGS. 5 and 10, the positioning slots 78 extend diagonally from a point adjacent the peripheral edge of the adjustment plate 76 toward the central opening thereof.

The retaining members 68 each include a cap screw 80 to facilitate their attachment to the adjustment plate 76. In this respect, the cap screw 80 of each retaining member is extended upwardly through a respective one of the positioning slots 78 and threadably received into the cylindrically configured portion thereof. In addition to being extended through the positioning slots 78, the cap screws 80 are extended through respective ones of three (3) elongate adjustment slots 82 disposed within the support platen 52. The adjustment slots 82 are oriented at the three o'clock, nine o'clock and twelve o'clock positions relative the linear edge portion 72 and extend linearly from points adjacent the arcuately contoured peripheral edge of the support platen 52 toward the center thereof. Disposed intermediate the cap portion of each cap screw 80 and the bottom surface of the adjustment plate 76 is a retaining washer 84.

In addition to the positioning slots 78, disposed within the adjustment plate 76 are three (3) arcuately contoured guide slots 88. The guide slots 88 are sized and configured to slidably receive respective ones of three (3) guide pins 90 extending perpendicularly from the bottom surface 52b of the support platen 52. Additionally, attached to the adjustment plate 76 in opposed relation are a pair of adjustment knobs 92.

As best seen in FIGS. 9 and 10, due to the manner in which the positioning slots 78 are oriented relative the adjustment slots 82 when the adjustment plate 76 is attached to the support platen 52, the rotation of the adjustment plate 76 in a counter-clockwise direction via the adjustment knobs 92 facilitates the simultaneous linear movement of the retaining members 68 toward the center of the support platen 52. Conversely, the clockwise rotation of the adjustment plate 76 via the adjustment knobs 92 facilitates the simultaneous linear movement of the retaining members 68 outwardly toward the arcuately contoured peripheral edge of the support platen 52. The retaining members 68 achieve their maximum outer positions when the cap screws 80 come into abutting contact with the ends of the positioning slots 78 disposed closest the arcuately contoured peripheral edge of the adjustment plate 76. The retaining members 68 reach their maximum inner positions when the cap screws 80 come into abutting contact with the ends of the positioning slots 78 disposed closest the central opening of the adjustment plate 76.

By selectively rotating the adjustment plate 76, the retaining members 68 may be positioned to accommodate varying sizes of pizza pans 12 therebetween. In this respect, the positions of the retaining member 68 are manipulated so as to cause the flange portion 15 of the pizza pan 12 to be disposed within the reduced diameter regions 70 of the retaining members 68 for purposes of maintaining the pizza pan 12 in a particular position upon the top surface 52a in vertical alignment with the upper mold 32. Once the retaining members 68 have been positioned to accommodate a particular pizza pan 12, further rotation of the adjustment plate 76 which could affect the positioning of the retaining members 68 may be prevented by tightening any one of the cap screws 80 which rigidly captures the adjustment plate 76 between the retaining washer 84 and the bottom surface 52b of the support platen 52.

As best seen in FIG. 5, the adjustment plate 76 is formed with an angled edge portion 94 which is disposed adjacent the linear edge portion 72 of the support platen 52 when the adjustment plate 76 is attached thereto. Advantageously, the formation of the adjustment plate 76 with the angled edge portion 94 prevents any portion thereof from protruding beyond the linear edge portion 72 when the retaining members 68 are positioned in their outermost or innermost positions via the rotation of the adjustment plate 76.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A pizza press for forming and par baking a pizza crust from a quantity of pizza dough disposed in a pizza pan, comprising:
   a frame having a base portion and an upper housing portion;
   an upper mold releasably attached to said upper housing portion and defining a generally planar bottom surface;
   a lower support platen releasably attached to said base portion and defining a generally planar top surface, said bottom and top surfaces extending along horizontal, generally parallel planes;
   a handle member pivotally connected to said upper housing portion and adapted to reciprocally move said upper mold between a loading position wherein the pizza dough may be introduced into the pizza pan and a flattening position wherein the pizza dough is compressed between the bottom surface of the upper mold and the pizza pan;
   at least two retaining members slidably attached to said support platen and extending upwardly from the top surface thereof; and
   an adjustment mechanism slidably attached to said support platen for selectively moving said retaining members linearly relative the top surface as needed to allow the pizza pan to be positioned therebetween.

2. The pizza press of claim 1 wherein said support platen includes three retaining members slidably engaged thereto.

3. The pizza press of claim 2 wherein said support platen has a generally circular configuration and said retaining members are positioned about the periphery of the support platen in intervals of approximately ninety degrees.

4. The pizza press of claim 2 wherein said adjustment mechanism comprises:
   an adjustment plate having three elongate positioning slots disposed therein, a portion of each of said retaining members being extended through and slidably movable within a respective one of said positioning slots; and
   a pair of adjustment knobs attached to said adjustment plate;
   said positioning slots being configured in a manner wherein the rotation of said adjustment plate in a first direction via said adjustment knobs simultaneously moves said retaining members linearly toward the center of the support platen and the rotation of said adjustment plate in a second direction simultaneously moves said retaining members linearly toward the peripheral edge of the support platen.

5. The pizza press of claim 4 wherein said adjustment plate further includes three arcuately contoured guide slots disposed therein and said support platen includes three guide pins extending therefrom, each of said guide pins being slidably received into a respective one of said guide slots.

6. The pizza press of claim 4 wherein the portion of each of said retaining members which is extended through a respective one of the positioning slots is selectively tightenable, and adapted to prevent the rotation of the adjustment plate when tightened.

7. The pizza press of claim 1 wherein said upper mold is releasably attached to a heating element of the upper housing portion in a manner wherein heat is transferred from the heating element to the bottom surface of the upper mold, said heating element being movable concurrently with said upper mold.

8. The pizza press of claim 1 wherein said upper mold and said pizza pan having generally circular configurations, and said pizza pan is sized to receive the bottom surface of the upper mold.

9. The pizza press of claim 1 wherein each of said retaining members is configured to partially capture a peripheral sidewall portion of the pizza pan.

10. The pizza press of claim 1 wherein said lower support platen is fabricated from a hard plastic material.

11. A pizza press for forming and par baking a pizza crust from a quantity of pizza dough disposed in a pizza pan, comprising:
    a frame;
    an upper mold releasably attached to said frame and defining a generally planar bottom surface;
    a lower support platen releasably attached to said frame and defining a generally planar top surface, said bottom and top surfaces extending along horizontal, generally parallel planes, and said upper mold being reciprocally movable between a loading position wherein the pizza dough may be introduced into the pizza pan and a flattening position wherein the pizza dough is compressed between the bottom surface of the upper mold and the pizza pan;
    at least two retaining members slidably attached to said support platen; and
    an adjustment mechanism slidably attached to said support platen for selectively moving said retaining members linearly relative the support platen as needed to allow the pizza pan to be positioned therebetween.

* * * * *